United States Patent
Schay

(10) Patent No.: US 11,367,962 B1
(45) Date of Patent: Jun. 21, 2022

(54) INDIRECTLY FED DIPOLE ANTENNA

(71) Applicant: BAE SYSTEMS Information and Electronic Systems Integration Inc., Nashua, NH (US)

(72) Inventor: Gary A. Schay, Stony Brook, NY (US)

(73) Assignee: BAE Systems Information and Electronic System Integration Inc., Nashua, NH (US)

( * ) Notice: Subject to any disclaimer, the term of this patent is extended or adjusted under 35 U.S.C. 154(b) by 0 days.

(21) Appl. No.: 17/124,613

(22) Filed: Dec. 17, 2020

(51) Int. Cl.
*H01Q 9/28* (2006.01)
*H01Q 21/06* (2006.01)
(Continued)

(52) U.S. Cl.
CPC ........... *H01Q 9/285* (2013.01); *G01S 13/931* (2013.01); *H01Q 1/22* (2013.01); *H01Q 1/325* (2013.01); *H01Q 21/062* (2013.01)

(58) Field of Classification Search
CPC ........ H01Q 1/325; H01Q 19/104; H01Q 5/49; H01Q 1/38; H01Q 9/28; H01Q 1/36; H01Q 3/267; H01Q 21/24; H01Q 7/00; H01Q 1/28; H01Q 9/285; H01Q 3/26; H01Q 9/40; H01Q 1/273; H01Q 13/085; H01Q 13/10; H01Q 9/27; H01Q 9/16; H01Q 9/42; H01Q 21/062; H01Q 3/2676; H01Q 5/40; H01Q 1/42; H01Q 21/205; H01Q 21/29; H01Q 21/064; H01Q 9/0421; H01Q 17/00; H01Q 21/00; H01Q 21/0087; H01Q 21/20; H01Q 3/24; H01Q 21/26; H01Q 21/22; H01Q 1/48; H01Q 21/061; H01Q 21/08; H01Q 5/22; H01Q 9/0407; H01Q 15/08; H01Q 3/30; H01Q 9/32; H01Q 1/246; H01Q 1/34; H01Q 11/14; H01Q 9/0442; H01Q 1/362; H01Q 21/0006; H01Q 25/02; H01Q 9/36; H01Q 19/062; H01Q 1/27; H01Q 1/286; H01Q 1/3275; H01Q 1/40; H01Q 21/28; H01Q 25/00; H01Q 3/2617; H01Q 9/26; H01Q 1/22; H01Q 1/32; H01Q 13/08; H01Q 19/06; H01Q 21/0075; H01Q 3/04; H01Q 1/02; H01Q 1/50; H01Q 1/523; H01Q 21/30; H01Q 9/30; H01Q 1/281;
(Continued)

(56) References Cited

U.S. PATENT DOCUMENTS 5,742,258 A * 4/1998 Kumpfbeck ........... H01Q 1/246
343/700 MS
5,929,822 A 7/1999 Kumpfbeck et al.
(Continued)

*Primary Examiner* — Dimary S Lopez Cruz
*Assistant Examiner* — Jesus E Cano
(74) *Attorney, Agent, or Firm* — Maine Cernota & Rardin; Gary McFaline

(57) ABSTRACT

An arrayable dipole antenna, the antenna comprising: at least one exciter configured to be fixed to a ground plane and, upon fixation thereto, to extend substantially perpendicularly therefrom; at least one radiator disposed adjacent the at least one exciter, opposite the ground plane; and at least one voltage feed source in electrical communication with each radiator, wherein each resonator is configured for electrical communication with the ground plane upon installation thereon, wherein at least one radiator is perpendicular to at least one exciter, and wherein each radiator is indirectly coupled to at least one exciter.

20 Claims, 8 Drawing Sheets

(51) Int. Cl.
*G01S 13/931* (2020.01)
*H01Q 1/22* (2006.01)
*H01Q 1/32* (2006.01)

(58) Field of Classification Search
CPC .......... H01Q 1/30; H01Q 1/364; H01Q 21/06; H01Q 3/2611; H01Q 3/2635; H01Q 5/314; H01Q 5/321; H01Q 1/288; H01Q 1/3233; H01Q 11/12; H01Q 21/10; H01Q 5/357; H01Q 5/371; H01Q 5/42; H01Q 7/005; H01Q 9/145; H01Q 1/242; H01Q 1/52; H01Q 1/526; H01Q 11/08; H01Q 15/002; H01Q 19/30; H01Q 21/065; H01Q 23/00; H01Q 3/2682; H01Q 3/44; H01Q 5/378; H01Q 1/12; H01Q 13/0258; H01Q 13/20; H01Q 13/206; H01Q 15/23; H01Q 19/19; H01Q 21/0025; H01Q 21/068; H01Q 21/12; H01Q 21/293; H01Q 3/08; H01Q 3/2605; H01Q 3/28; H01Q 9/0485; H01Q 9/065; H01Q 1/08; H01Q 1/18; H01Q 1/24; H01Q 1/243; H01Q 11/10; H01Q 13/0208; H01Q 13/04; H01Q 13/18; H01Q 15/0013; H01Q 15/006; H01Q 3/38; H01Q 5/25; H01Q 5/45; H01Q 9/14; H01Q 9/46; H01Q 1/002; H01Q 1/10; H01Q 1/2225; H01Q 1/3283; H01Q 1/3291; H01Q 1/405; H01Q 11/02; H01Q 13/28; H01Q 15/0026; H01Q 15/02; H01Q 15/06; H01Q 15/244; H01Q 19/023; H01Q 19/10; H01Q 19/13; H01Q 19/17; H01Q 19/192; H01Q 21/0043; H01Q 21/005; H01Q 25/008; H01Q 3/36; H01Q 5/00; H01Q 5/335; H01Q 5/50; H01Q 9/0414; H01Q 1/04; H01Q 1/1207; H01Q 1/247; H01Q 1/248; H01Q 1/282; H01Q 1/44; H01Q 13/025; H01Q 13/106; H01Q 15/0006; H01Q 15/0046; H01Q 15/0086; H01Q 15/10; H01Q 17/001; H01Q 19/025; H01Q 19/108; H01Q 21/0056; H01Q 21/0093; H01Q 21/263; H01Q 25/007; H01Q 3/02; H01Q 3/06; H01Q 3/22; H01Q 3/242; H01Q 3/247; H01Q 3/2658; H01Q 3/34; H01Q 3/46; H01Q 5/307; H01Q 7/06; H01Q 9/38; H01Q 1/007; H01Q 1/06; H01Q 1/084; H01Q 1/085; H01Q 1/1221; H01Q 1/1292; H01Q 1/14; H01Q 1/2208; H01Q 1/283; H01Q 1/425; H01Q 1/528; H01Q 11/105; H01Q 13/103; H01Q 13/12; H01Q 15/0053; H01Q 15/0066; H01Q 15/14; H01Q 15/145; H01Q 15/18; H01Q 15/24; H01Q 21/0012; H01Q 21/0031; H01Q 21/14; H01Q 21/245; H01Q 25/004; H01Q 25/005; H01Q 3/443; H01Q 5/328; H01Q 5/392; H01Q 5/48; H01Q 9/045; H01Q 9/20; H01Q 9/22; H01Q 9/34; G01S 13/931; H04B 7/0408; H04B 7/0491; H04B 7/04
See application file for complete search history.

(56) References Cited

U.S. PATENT DOCUMENTS

2010/0283699 A1* 11/2010 Apostolos ............ H01Q 1/3275
343/792
2017/0062944 A1* 3/2017 Zimmerman .......... H01Q 1/246

\* cited by examiner

INDIRECTLY FED DIPOLE ANTENNA

FIELD OF THE DISCLOSURE

The following disclosure relates generally to antenna design and, more specifically, to dipole antenna element design.

BACKGROUND

A dipole antenna is a type of antenna that produces a radiation pattern approximating that of an elementary electric dipole with a radiating structure supporting a line current so energized that the current has only one node at each end. A dipole antenna commonly consists of two identical conductive elements, such as metal wires or rods, and includes such well-known antennas as traditional "rabbit ear" television antennas. Weight, cost, and size are significant problems for current dipole antenna designs, which are typically directly fed (i.e. they utilize physical connections to a feed network, the components between the beam-shaping part of the antenna and a first amplifier).

An exemplary, prior art, direct-fed, dipole antenna design includes an antenna element that is 3 inches deep and utilizes metallized walls, a base, and a radiating element. The walls and base are covered with Radar Absorptive Material (RAM) to reduce corner-reflections from these surfaces, increasing cost and weight, as well as manufacturing complexity, compared to a design where RAM is not required.

What is needed, therefore, are dipole antennas that can be manufactured at a lower cost and made to be a smaller size while maintaining or improving on performance, relative to current designs.

SUMMARY

Embodiments of the present disclosure provide an antenna element of approximately one-inch depth that does not require metalized walls, RAM, or a radiating element, as is required in current, direct-fed dipole antenna designs, since the antenna element of embodiments has no corner-reflection surfaces. The elimination of the walls, RAM, and reduced depth results in a lighter and lower cost antenna element, potentially with a lower Radar Cross Section (RCS). Such a design, in embodiments, is indirectly fed, in embodiments through a magnetic coupling via a feed network. In other embodiments, the design is indirectly fed via capacitive or other suitable coupling.

One embodiment of the present disclosure provides an arrayable dipole antenna, the antenna comprising: at least one exciter configured to be fixed to a ground plane and, upon fixation thereto, to extend substantially perpendicularly therefrom; at least one radiator disposed adjacent the at least one exciter, opposite the ground plane; and at least one voltage feed source in electrical communication with each radiator, wherein each resonator is configured for electrical communication with the ground plane upon installation thereon, wherein at least one radiator is perpendicular to at least one exciter, and wherein each radiator is indirectly coupled to at least one exciter.

Another embodiment of the present disclosure provides such an arrayable dipole antenna wherein the at least one radiator is configured to be positioned substantially parallel to the ground plane upon installation of the arrayable dipole element thereon.

A further embodiment of the present disclosure provides such an arrayable dipole antenna wherein the at least one radiator comprises a dipole element.

Yet another embodiment of the present disclosure provides such an arrayable dipole antenna wherein the at least one radiator comprises a pair of dipole elements.

A yet further embodiment of the present disclosure provides such an arrayable dipole antenna further comprising a compensation network configured to mitigate coupling effects that occur between the dipole pair.

Still another embodiment of the present disclosure provides such an arrayable dipole antenna wherein each dipole element is magnetically coupled to an exciter configured to enable a double-tuned network and provide adjustable impedance matching while minimizing reflections and structural radar cross section.

A still further embodiment of the present disclosure provides such an arrayable dipole antenna wherein the radiator is connected to the exciter through indirect magnetic coupling.

Even another embodiment of the present disclosure provides such an arrayable dipole antenna wherein the radiator is connected to the exciter through indirect capacitive coupling.

An even further embodiment of the present disclosure provides such an arrayable dipole antenna wherein the antenna is mounted on an exterior surface of a vehicle, which acts as the ground plane.

A still even another embodiment of the present disclosure provides a vehicle comprising a plurality of the arrayable dipole antenna mounted on an exterior surface of thereof, which is configured to act as the ground plane.

A still even further embodiment of the present disclosure provides such an arrayable dipole antenna wherein the at least one radiator is spaced above the at least one exciter with an air gap of approximately 0.10" and the exciter is installed 0.075" above the ground plane, Still yet another embodiment of the present disclosure provides such an arrayable dipole antenna wherein the polarization of the dipole radiation is parallel to the at least one radiator.

A still yet further embodiment of the present disclosure provides such an arrayable dipole antenna wherein the at least one voltage feed source comprises two voltage feed sources for each exciter and wherein the two voltage feed sources are equal amplitude and 180° out-of-phase.

Even yet another embodiment of the present disclosure provides such an arrayable dipole antenna wherein the at least one radiator disposed adjacent the at least one resonator, opposite the ground plane, is rotated slightly from a point along an axis parallel to the polarization of dipole radiation, such that it is not perfectly parallel to the ground plane.

An even yet further embodiment of the present disclosure provides such an arrayable dipole antenna further comprising a micro strip feed network configured to provide a required amplitude and phase for the at least one radiator.

Still even yet another embodiment of the present disclosure provides such an arrayable dipole antenna wherein the antenna is configured to be tilted away from a vertical orientation, relative to the ground plane, upon installation of the arrayable dipole element thereon.

One embodiment of the present disclosure provides an arrayable dipole antenna, the antenna comprising: at least one exciter configured to be fixed to a ground plane and, upon fixation thereto, to extend substantially perpendicularly therefrom; at least one pair of dipole elements disposed adjacent the at least one exciter, opposite the ground plane; at least one voltage feed source in electrical communication with each pair of dipole elements; and a compensation network configured to mitigate coupling effects that occur between the dipole elements, wherein each exciter is configured for electrical communication with the ground plane upon installation thereon, wherein at least one dipole element is perpendicular to at least exciter, and wherein each the dipole element is indirectly coupled to at least one exciter.

Another embodiment of the present disclosure provides such an arrayable dipole antenna wherein the indirect coupling is capacitive coupling.

A further embodiment of the present disclosure provides such an arrayable dipole antenna wherein the indirect coupling is magnetic coupling.

One embodiment of the present disclosure provides a system of vehicle-mounted antennas, the system comprising: a plurality of arrayable dipole antennas, each arrayable dipole antenna comprising: at least one exciter configured to be fixed to a ground plane and, upon fixation thereto, to extend substantially perpendicularly therefrom; at least one pair of dipole elements disposed adjacent the at least one exciter, opposite the ground plane; at least one voltage feed source in electrical communication with each pair of dipole elements, a compensation network configured to mitigate coupling effects that occur between the dipole elements, wherein each exciter is configured for electrical communication with the ground plane upon installation thereon, wherein at least one dipole element is perpendicular to at least exciter, and wherein each the dipole element is indirectly coupled to at least one exciter wherein the ground plane comprises an exterior surface of a vehicle, and wherein each of the plurality of arrayable dipole antennas is mounted to the exterior surface of the vehicle.

The features and advantages described herein are not all-inclusive and, in particular, many additional features and advantages will be apparent to one of ordinary skill in the art in view of the drawings, specification, and claims. Moreover, it should be noted that the language used in the specification has been selected principally for readability and instructional purposes and not to limit the scope of the inventive subject matter.

These and other features of the present embodiments will be understood better by reading the following detailed description, taken together with the figures herein described. The accompanying drawings are not intended to be drawn to scale. For purposes of clarity, not every component may be labeled in every drawing.

DETAILED DESCRIPTION

As a preliminary matter, an antenna feed network 108, as used herein, refers to the components of an antenna that feed radio waves to the rest of the antenna structure, or, in receiving antennas, collect incoming radio waves, convert them to electric currents, and transmit them to a receiver. Typically the antenna feed network 108 comprises the component(s) between a beam-shaping portion of the antenna and a first amplifier.

Figure 1A:
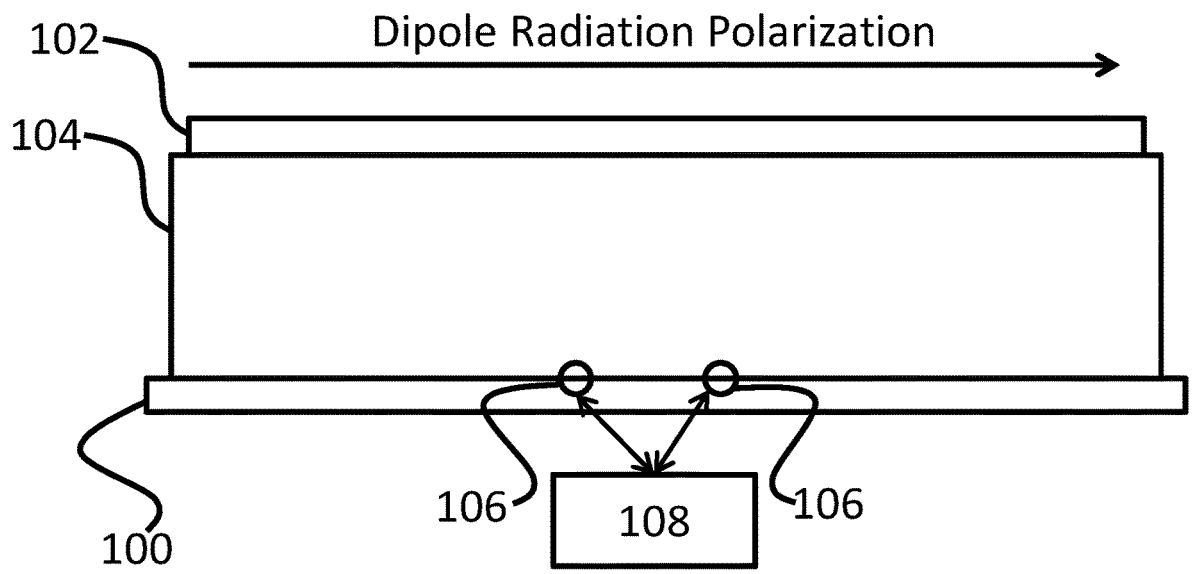
FIG. 1A is a side-elevation schematic showing a coupled dipole radiator and secondary resonator on an infinite ground plane, in accordance with embodiments of the present disclosure.
Figure 1B:
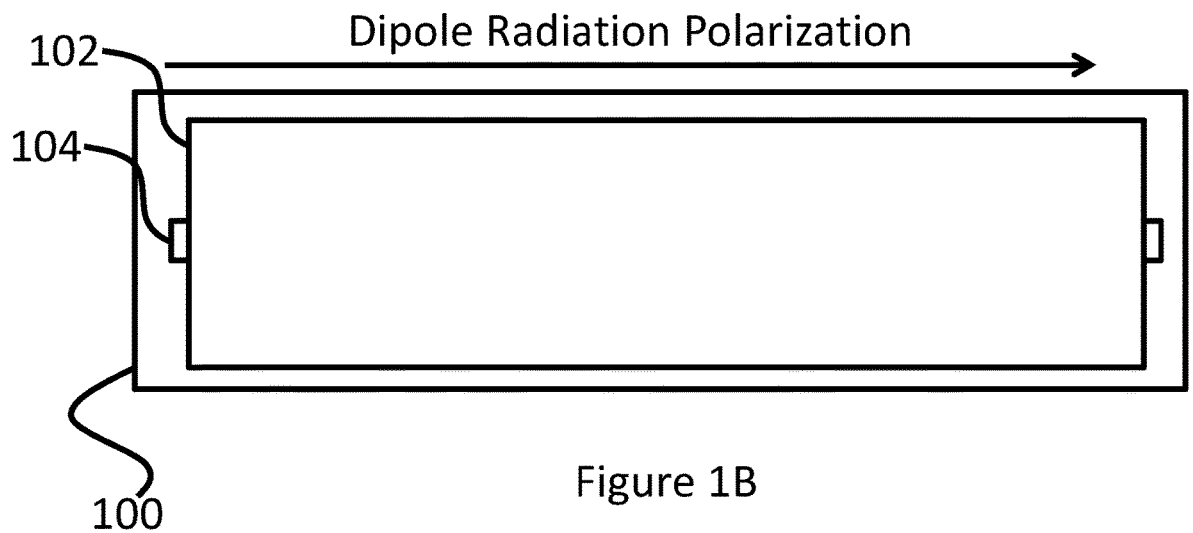
FIG. 1B is a top-elevation schematic showing a coupled dipole radiator and secondary resonator on an infinite ground plane, in accordance with embodiments of the present disclosure.

Now referring to FIGS. 1A and 1B, an exemplary embodiment of the present disclosure provides an antenna element comprising a pair of dipole elements 102, which may also be referred to as dipole radiators 102, that are activated by indirect magnetic coupling from a feed network 108 through a feed source or sources 106, the pair of dipole elements 102 being positioned above an exciter 104, which may also be referred to herein as a secondary resonator 104, disposed on a ground plane 100. In other embodiments, the design is indirectly fed via capacitive or other suitable coupling. These methods of coupling to the dipole 102 allow for a significant improvement in Voltage Standing Wave Ratio (VSWR) over a specific bandwidth, as compared to a direct-fed dipole antenna design, when using antennas of similar size. Alternatively, the same VSWR as a direct-fed dipole antenna design can be achieved using indirect feeding with dipole elements 102 that are much smaller, in embodiments only one-inch above a base, as compared to a height of 3" using a direct-fed dipole antenna design to obtain the same VSWR performance, and that do not require walls.

In embodiments, the antenna is mounted on an exterior surface of a vehicle, which serves as the ground plane 100. A vehicle in this context should be understood to include air, land, sea, and space-based vehicles of any kind, such as automobiles, planes, trains, satellites, ships, and the like.

In embodiments, an antenna feed network 108 comprises a compensation network to mitigate coupling effects that occur between the dipole pair 102; therefore, resulting in no degradation in VSWR of the overall antenna element structure. The compensation network ensures that the same current magnitudes are present on all dipole arms in the presence of coupling. In embodiments, standard current design methods, such as a micro strip feed power dividers, are used in this compensation network.

Notably, such a design allows individual elements combined to form an array to be kept relatively close to one another without interference that would typically be caused by intermodulation effects, allowing the use of a metallic base, which helps to reduce the Radar Cross Section (RCS) of the antenna by allowing it to blend in with a structure on which it is mounted.

Figure 4A:
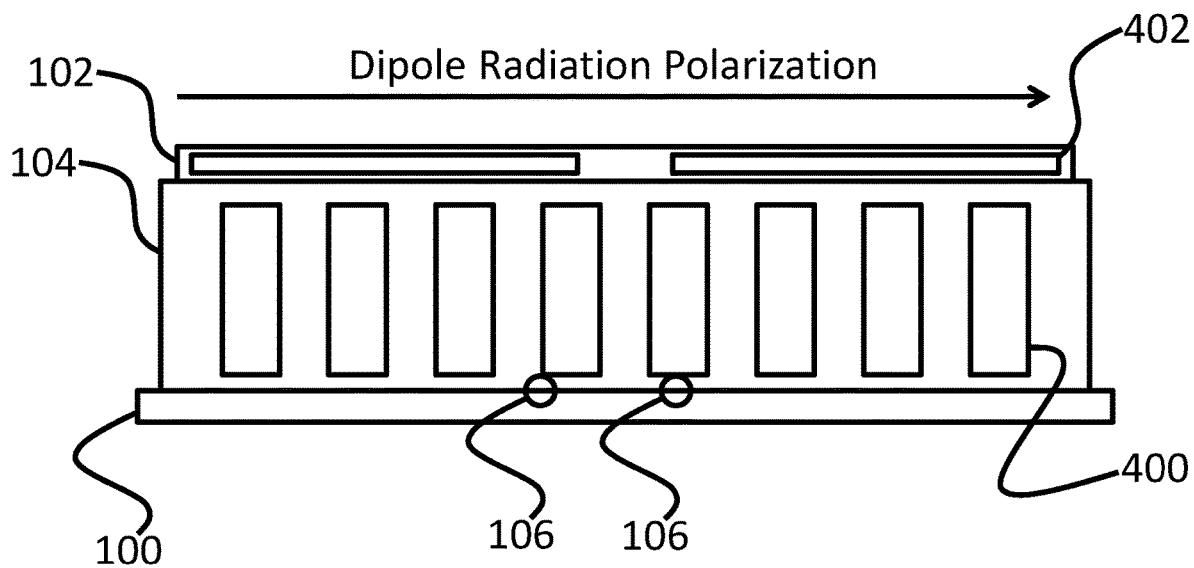
FIG. 4A is a side-elevation schematic showing a coupled dipole antenna element, in accordance with embodiments of the present disclosure.
Figure 4B:
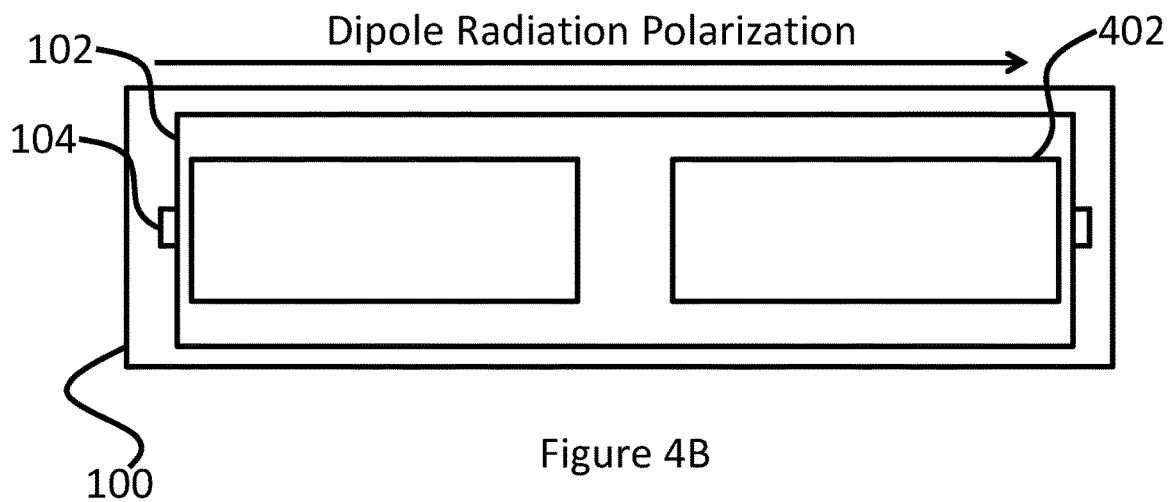
FIG. 4B is a top-elevation schematic showing a coupled dipole antenna element, in accordance with embodiments of the present disclosure.

In embodiments, such as that shown in FIGS. 4A and 4B, the antenna comprises two dipole radiators 402, with each dipole radiator 402 being magnetically coupled to a secondary resonator 400, which is also herein referred to as an exciter 400. A purpose of the secondary resonator 400 is to enable a double-tuned network and provide adjustable impedance matching while minimizing reflections and Radar Cross Section (RCS).

Figure 2A:
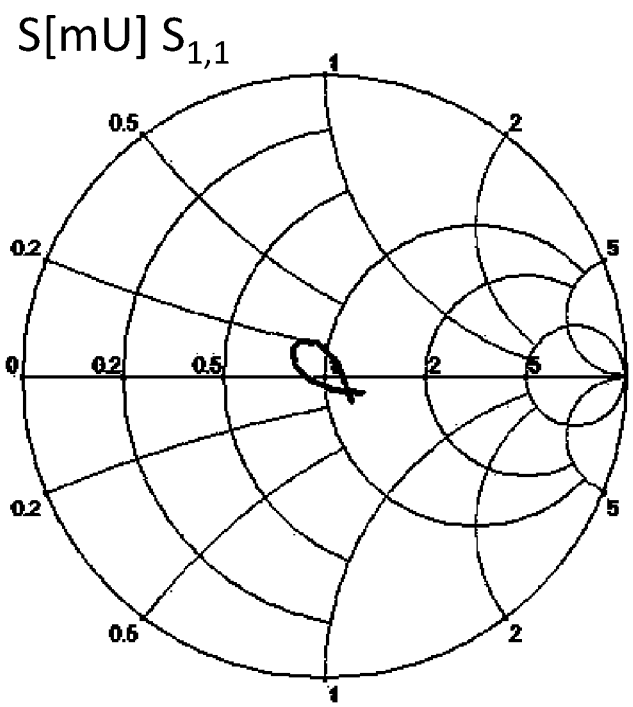
FIG. 2A is a diagram describing impedance of a double-tuned coupled dipole antenna, in accordance with embodiments of the present disclosure.
Figure 2B:
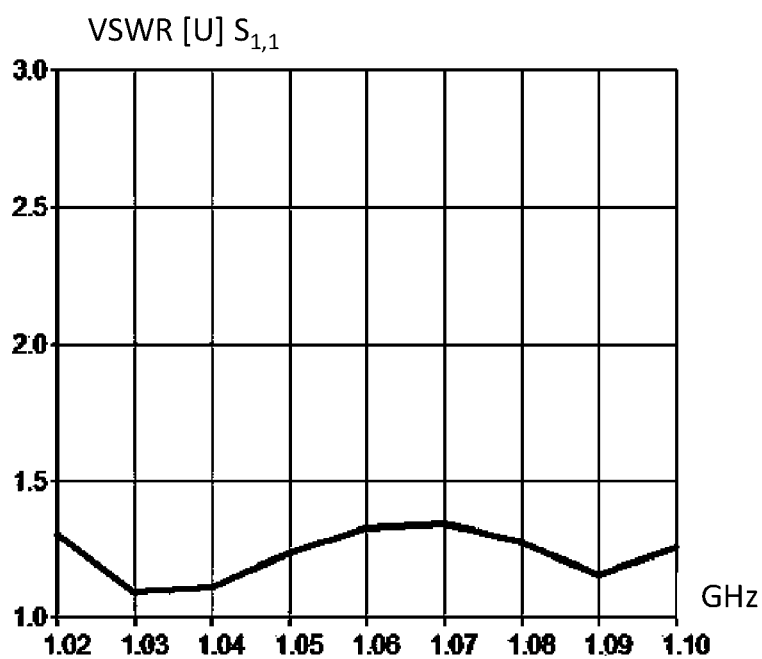
FIG. 2B is a diagram describing VSWR of a double-tuned coupled dipole antenna, in accordance with embodiments of the present disclosure.

In embodiments, the dipole is spaced above the exciter (secondary resonator) 400 with an air gap of approximately 0.10", the exciter is installed 0.075" above a ground plane 100, the two feed source 106 voltages for each exciter 400 are equal amplitude and 180° out-of-phase (balanced), canceling undesired z-axis radiation, and the polarization of the dipole 402 radiation is parallel to the x-axis. An electromagnetic model simulation of this embodiment was constructed and analyzed; the resulting impedance and VSWR are shown in FIGS. 2A and 2B, where the maximum VSWR is less than 1.35:1 matched to 50 ohms from 1.02 GHz to 1.1 GHz.

Figure 3A:
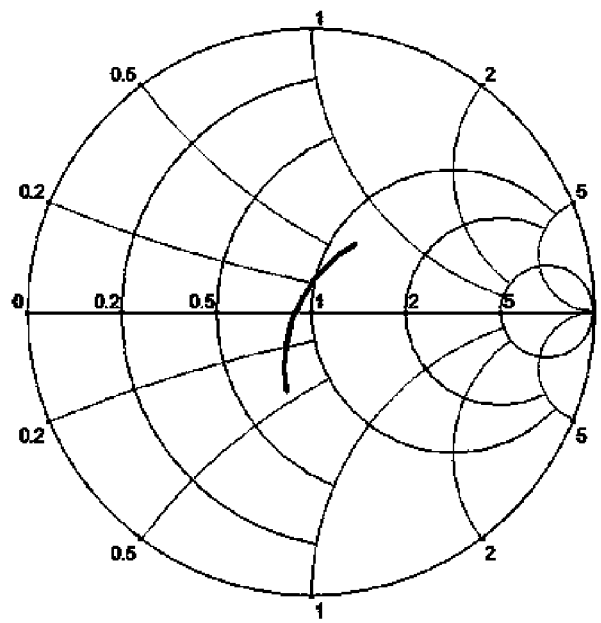
FIG. 3A is a diagram describing impedance of a single-tuned dipole antenna 1.15" above a metal ground plane, in accordance with embodiments of the present disclosure.
Figure 3B:
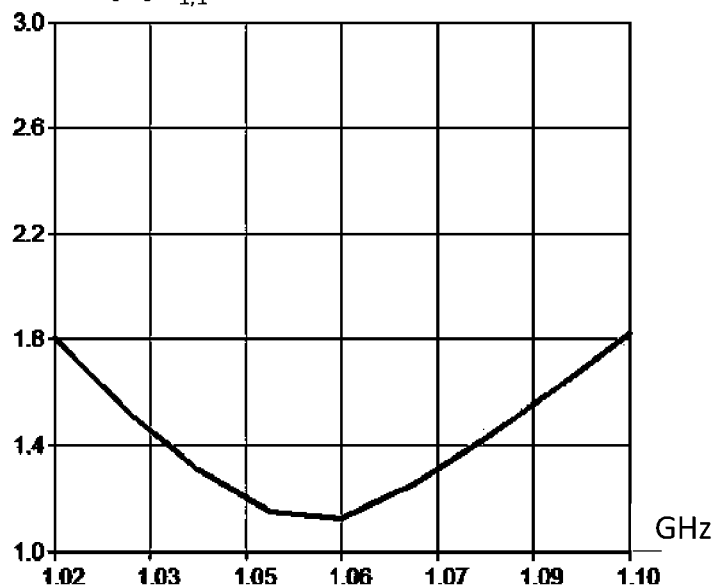
FIG. 3B is a diagram describing VSWR of a single-tuned dipole antenna 1.15" above a metal ground plane, in accordance with embodiments of the present disclosure.

For comparison purposes, a single-tuned dipole antenna installed at the same height (1.15") produces a maximum VSWR of 1.8:1 matched to 20 ohms, as described in FIGS. 3A and 3B. The mismatch of the dipole 402 impedance to a standard 50 ohm connector impedance would require an impedance matching network, however, resulting in slightly higher VSWR at 50 ohms.

An additional advantage of this design approach is that the metal enclosure (septum walls) used in prior art, direct-fed dipole antennas is not needed. The elimination of the metal enclosure results in a significant weight reduction, the precise weight reduction possible being dependent on the specifics of the design. Additionally, the RCS of this design can be further reduced by tilting the antenna back slightly to avoid specular reflections. In embodiments, the baseline metal enclosure is coated in RAM to reduce corner reflections from its walls and the antenna base.

Figure 5A:
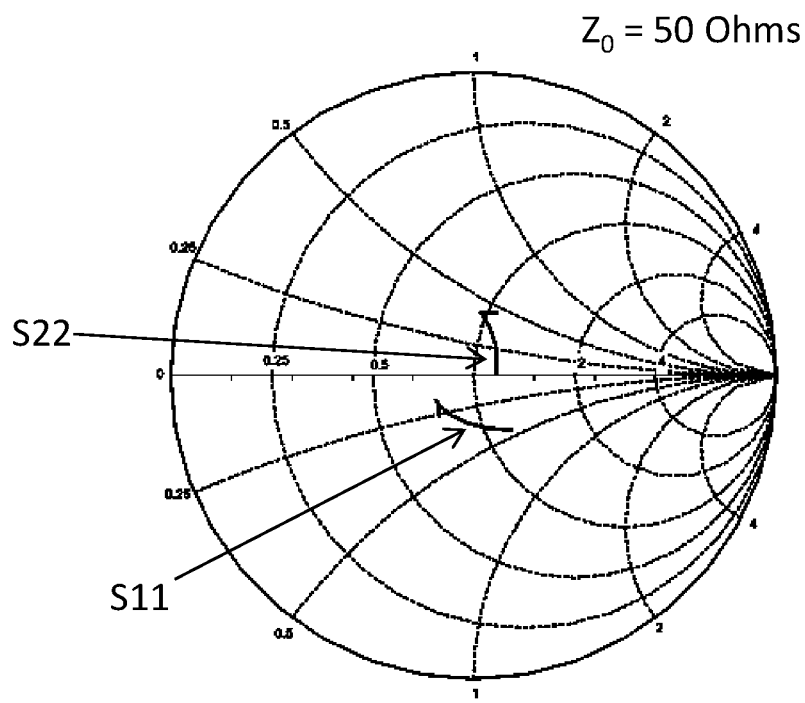
FIG. 5A is a diagram describing coupled dipole antenna element impedance of feed sources for each dipole, in accordance with embodiments of the present disclosure.
Figure 5B:
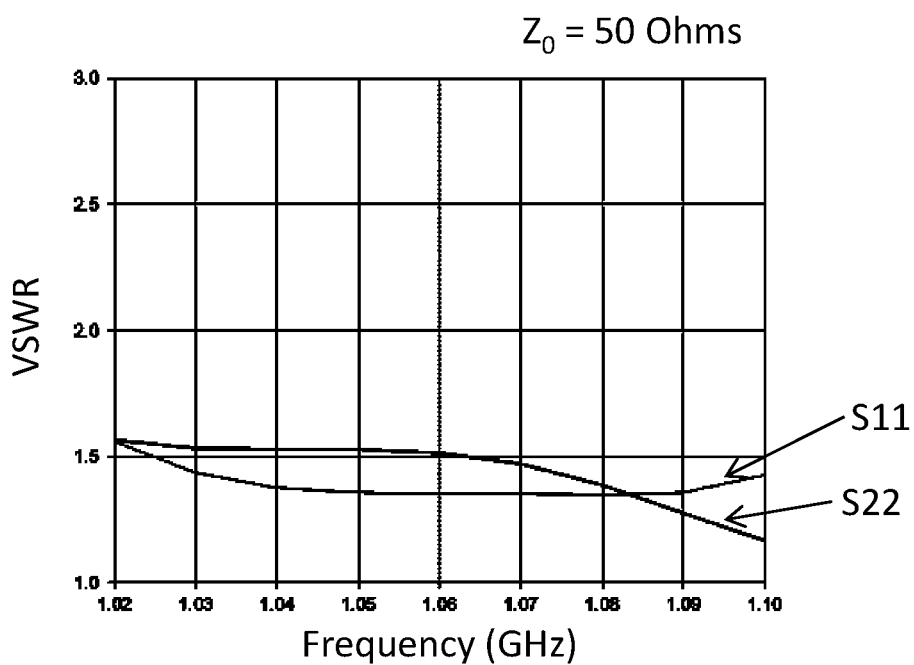
FIG. 5B is a diagram describing coupled dipole antenna element VSWR of feed sources for each dipole, in accordance with embodiments of the present disclosure.

Now referring to FIGS. 5A and 5B, an analysis is performed on the embodiment shown in FIGS. 4A and 4B. More specifically, the infinite ground plane 100 is removed and replaced with a finite ground plane 100 6.00" wide by 12.5" high. The active input impedance and VSWR for two of the feed sources 106 feeding one of the two dipoles 402 is shown in FIGS. 5A and 5B, respectively. Note the impedance of the feed sources 106 for a dipole 402 are not equal. No tuning of the dipoles 402 can improve the VSWR beyond the point where the VSWR of each dipole 402 yields the lowest VSWR for the pair.

The cause of this impedance imbalance is coupling between the two dipoles 402 and, to a lesser extent, the exciters 400. The coupling impact can be significantly reduced by adjusting the amplitude and phase difference of the feed sources 106. Determining the proper feed source 106 amplitude and phase is accomplished by analyzing currents on wires feeding each dipole 402.

The currents on the two feed sources 106 for the single dipole element shown in FIG. 1 are exactly equal in magnitude and opposite in phase (180° phase difference) at all frequencies over the operating bandwidth. The four wire currents for the two dipoles are shown in Table 1. Note the wire currents for outer feed sources 1 and 4 are balanced and the same is true for feed sources 2 and 3. However the currents for each dipole are imbalanced by approximately 1 dB in amplitude and approximately 12° in phase.

| Exciter #/Feed Source # | Current Magnitude (dB) | Current Phase (deg) |
| --- | --- | --- |
| 1/1 (0° Feed Source) | 20.92 | 5.4 |
| 1/2 (180° Feed Source) | 19.96 | 168.2 |
| 2/1 (0° Feed Source) | 19.96 | −11.8 |
| 2/2 (180° Feed Source) | 20.92 | −174.7 |

Figure 6A:
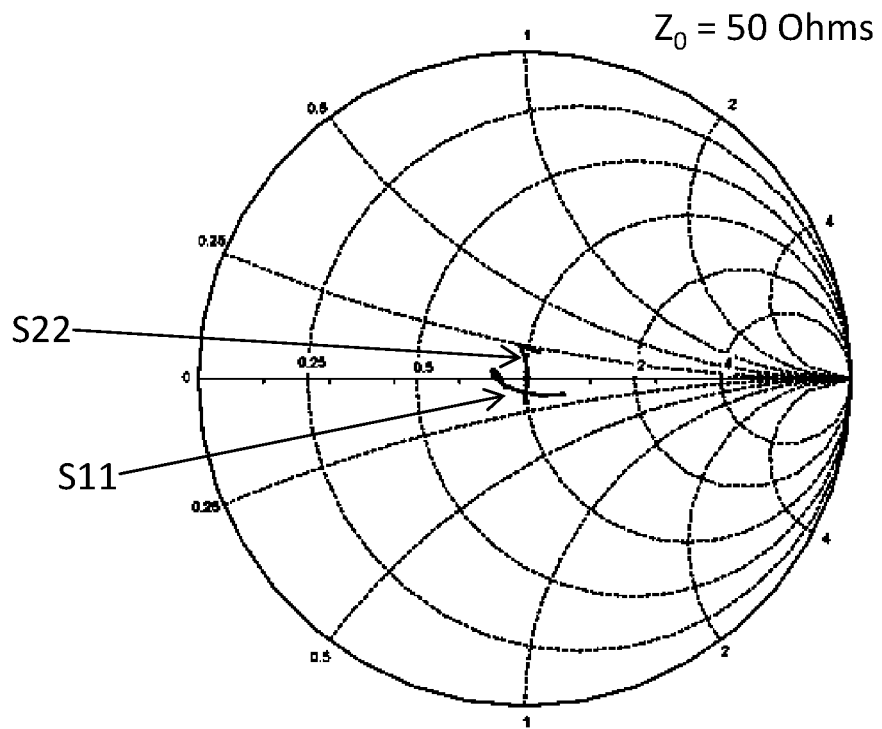
FIG. 6A is a diagram describing coupled dipole antenna element impedance with imbalanced feed source voltages, in accordance with embodiments of the present disclosure.
Figure 6B:
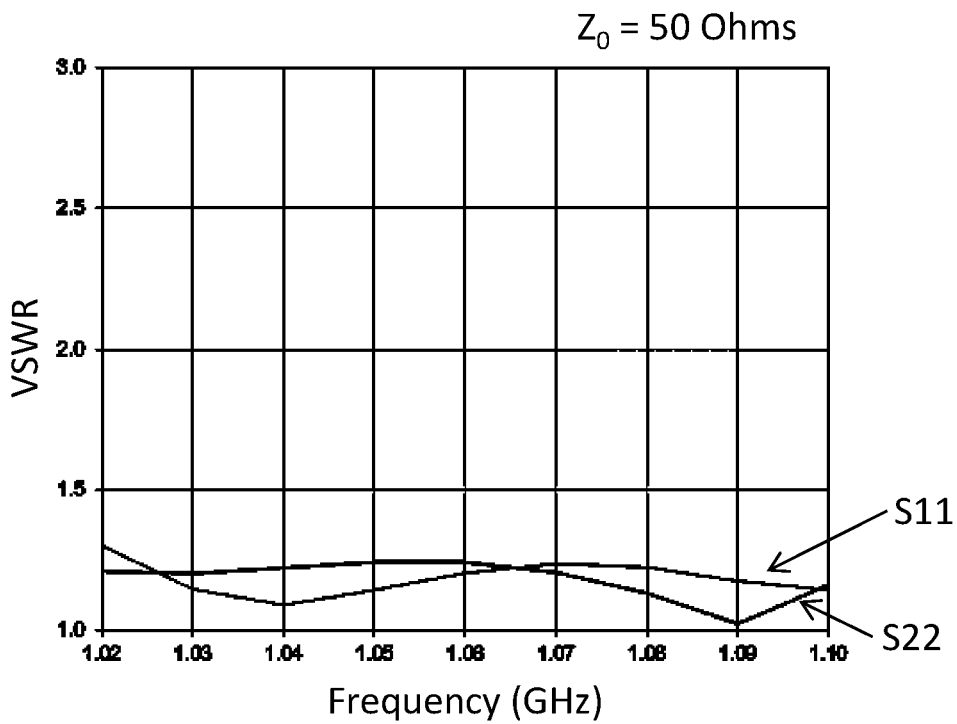
FIG. 6B is a diagram describing coupled dipole antenna element VSWR with imbalanced feed source voltages, in accordance with embodiments of the present disclosure.

In embodiments, feed source 106 voltages are intentionally unbalanced to achieve an active impedance where the currents at the two dipoles 402 are close to meeting a balanced condition. The resulting impedance and VSWR improvement obtained by such a configuration is shown in FIGS. 6A and 6B. This model is used to evaluate antenna pattern performance as a single active antenna embedded in an array with two terminated antennas on either side and an eight-element array. In embodiments, a microstrip feed network 108 is used to provide the required amplitude and phase for the dipole pair 402.

Figure 7:
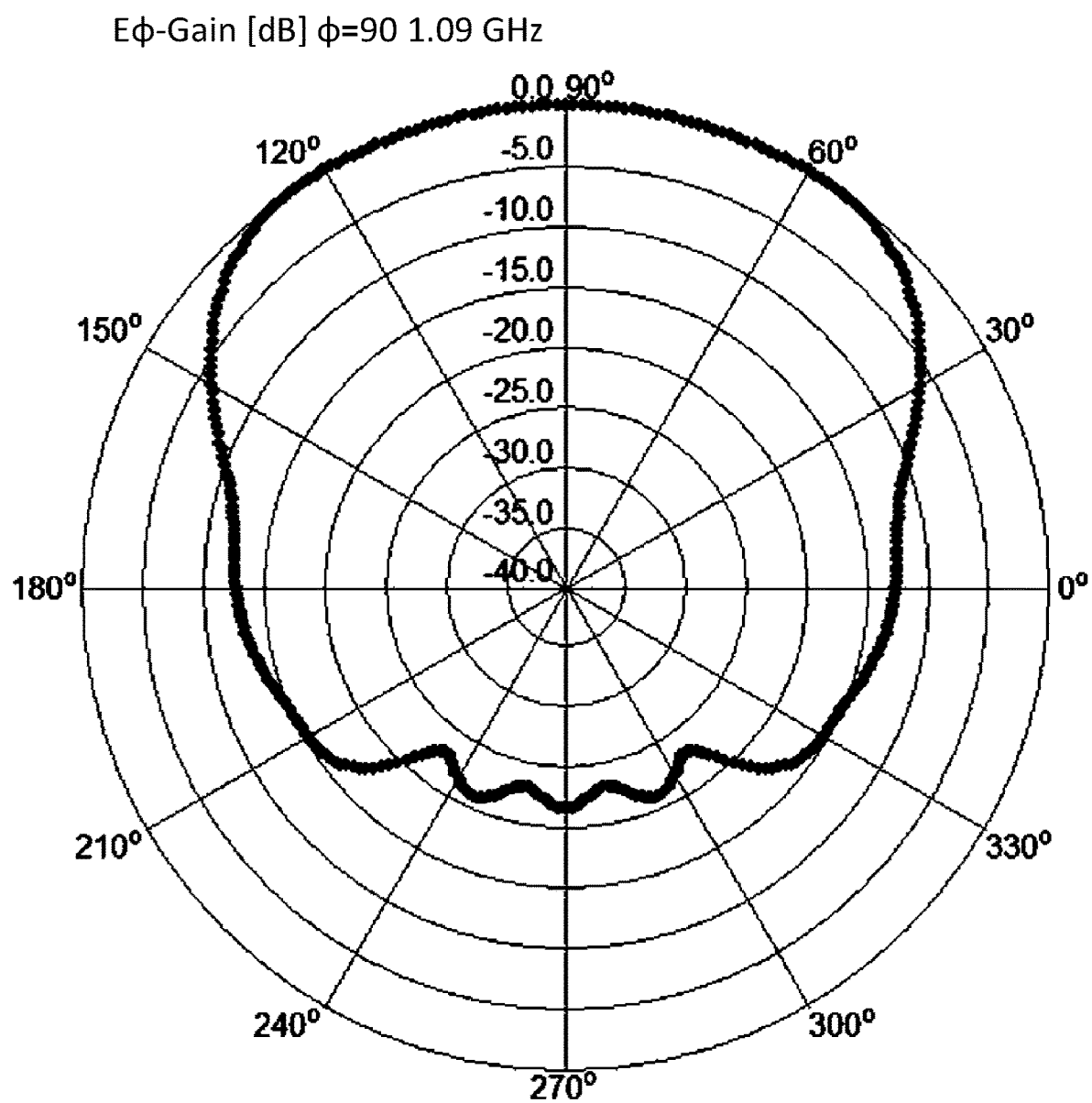
FIG. 7 is a diagram describing the azimuth pattern of a single antenna having no walls in an array, in accordance with embodiments of the present disclosure.

FIG. 7 is a diagram describing the azimuth pattern of a single antenna having no walls in an array, in accordance with embodiments of the present disclosure.

Figure 8:
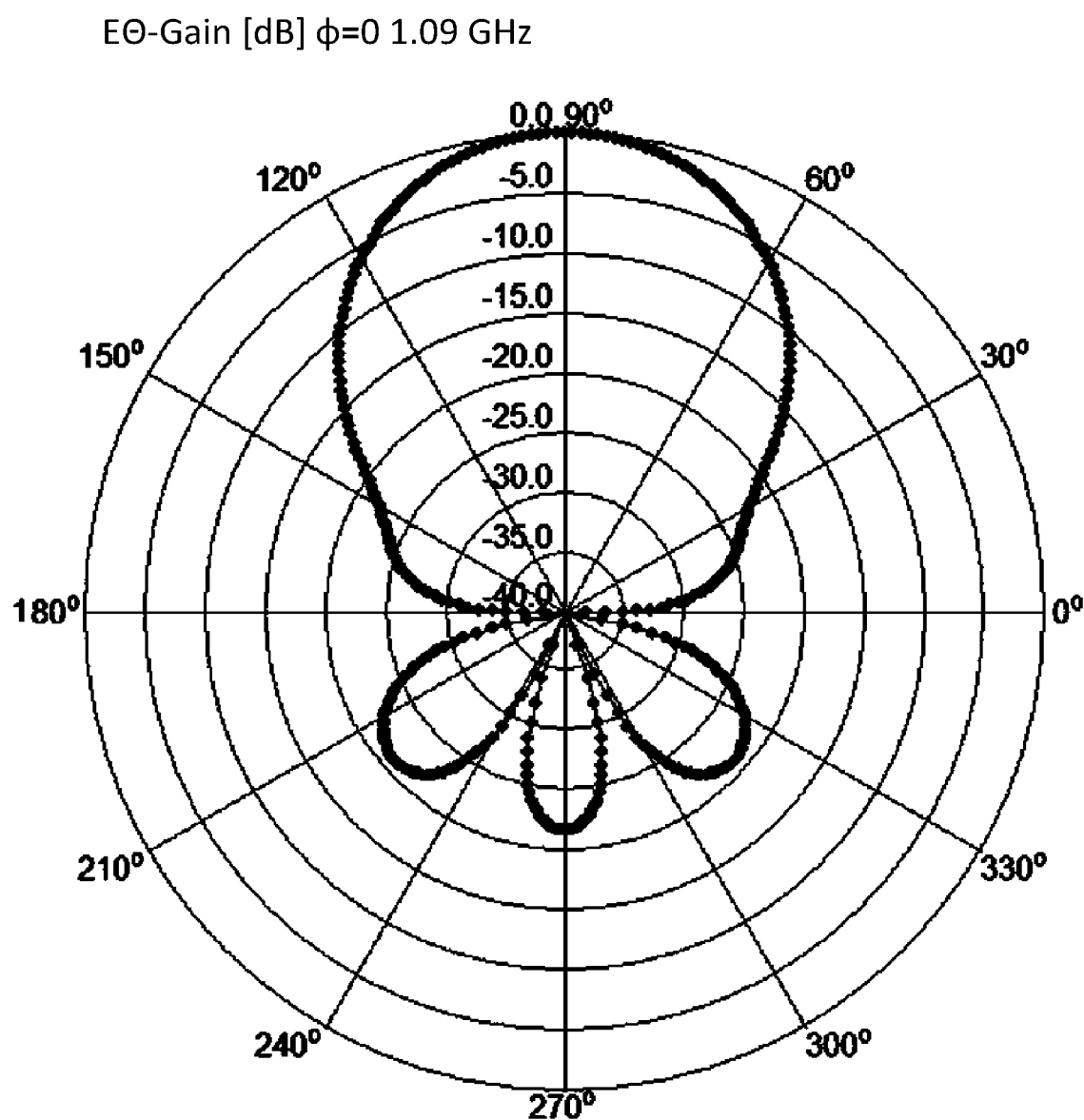
FIG. 8 is a diagram describing the elevation pattern of a single antenna having no walls in an array, in accordance with embodiments of the present disclosure.

Lastly, FIG. 8 is a diagram describing the elevation pattern of a single, two-element antenna having no walls in an array, in accordance with embodiments of the present disclosure.

The foregoing description of the embodiments of the present disclosure has been presented for the purposes of illustration and description. It is not intended to be exhaustive or to limit the present disclosure to the precise form disclosed. Many modifications and variations are possible in light of this disclosure. It is intended that the scope of the present disclosure be limited not by this detailed description, but rather by the claims appended hereto.

A number of implementations have been described. Nevertheless, it will be understood that various modifications may be made without departing from the scope of the disclosure. Although operations are depicted in the drawings in a particular order, this should not be understood as requiring that such operations be performed in the particular order shown or in sequential order, or that all illustrated operations be performed, to achieve desirable results.

What is claimed is:

1. An arrayable dipole antenna, the antenna comprising:
   at least one exciter configured to be fixed 0.075" above a ground plane and, upon fixation thereto, to extend substantially perpendicularly therefrom;
   at least one radiator disposed adjacent said at least one exciter, opposite said ground plane; and
   at least one voltage feed source in electrical communication with each radiator, wherein each radiator is configured for electrical communication with said ground plane upon installation thereon, wherein at least one radiator is perpendicular to at least one exciter, and wherein each said radiator is indirectly coupled to at least one exciter.

2. The arrayable dipole antenna of claim 1 wherein the at least one radiator is configured to be positioned substantially parallel to the ground plane upon installation of the arrayable dipole element thereon.

3. The arrayable dipole antenna of claim 1 wherein said at least one radiator comprises a dipole element.

4. The arrayable dipole antenna of claim 1 wherein said at least one radiator comprises a pair of dipole elements.

5. The arrayable dipole antenna of claim 4 further comprising a compensation network configured to mitigate coupling effects that occur between the dipole pair.

6. The arrayable dipole antenna of claim 4 wherein each dipole element is magnetically coupled to an exciter configured to enable a double-tuned network and provide adjustable impedance matching while minimizing reflections and structural radar cross section.

7. The arrayable dipole antenna of claim 1 wherein said radiator is connected to said exciter through indirect magnetic coupling.

8. The arrayable dipole antenna of claim 1 wherein said radiator is connected to said exciter through indirect capacitive coupling.

9. The arrayable dipole antenna of claim 1 wherein the antenna is mounted on an exterior surface of a vehicle, which acts as the ground plane.

10. A vehicle comprising a plurality of the arrayable dipole antenna of claim 1 mounted on an exterior surface of thereof, which is configured to act as the ground plane.

11. The arrayable dipole antenna of claim 1 wherein the at least one radiator is spaced above the at least one exciter with an air gap of approximately 0.10".

12. The arrayable dipole antenna of claim 11 wherein the polarization of the dipole radiation is parallel to the at least one radiator.

13. The arrayable dipole antenna of claim 12 wherein the at least one voltage feed source comprises two voltage feed sources for each exciter and wherein the two voltage feed sources are equal amplitude and 180° out-of-phase.

14. The arrayable dipole antenna of claim 13 wherein said at least one radiator disposed adjacent said at least one resonator, opposite said ground plane, is rotated slightly from a point along an axis parallel to the polarization of dipole radiation, such that it is not perfectly parallel to the ground plane.

15. The arrayable dipole antenna of claim 1 further comprising a microstrip feed network configured to provide a required amplitude and phase for the at least one radiator.

16. The arrayable dipole antenna of claim 1 wherein said antenna is configured to be tilted away from a vertical orientation, relative to the ground plane, upon installation of the arrayable dipole element thereon.

17. An arrayable dipole antenna, the antenna comprising:
at least one exciter configured to be fixed 0.075" above a ground plane and, upon fixation thereto, to extend substantially perpendicularly therefrom;
at least one pair of dipole elements disposed adjacent said at least one exciter, opposite said ground plane;
at least one voltage feed source in electrical communication with each pair of dipole elements; and
a compensation network configured to mitigate coupling effects that occur between the dipole elements,
wherein each exciter is configured for electrical communication with said ground plane upon installation thereon,
wherein at least one dipole element is perpendicular to at least exciter, and
wherein each said dipole element is indirectly coupled to at least one exciter.

18. The arrayable dipole antenna of claim 17 wherein the indirect coupling is capacitive coupling.

19. The arrayable dipole antenna of claim 17 wherein the indirect coupling is magnetic coupling.

20. A system of vehicle-mounted antennas, the system comprising:
a plurality of arrayable dipole antennas, each arrayable dipole antenna comprising:
at least one exciter configured to be fixed 0.075" above a ground plane and, upon fixation thereto, to extend substantially perpendicularly therefrom;
at least one pair of dipole elements disposed adjacent said at least one exciter, opposite said ground plane;
at least one voltage feed source in electrical communication with each pair of dipole elements,
a compensation network configured to mitigate coupling effects that occur between the dipole elements,
wherein each exciter is configured for electrical communication with said ground plane upon installation thereon,
wherein at least one dipole element is perpendicular to at least exciter, and
wherein each said dipole element is indirectly coupled to at least one exciter
wherein the ground plane comprises an exterior surface of a vehicle, and
wherein each of the plurality of arrayable dipole antennas is mounted to the exterior surface of the vehicle.

* * * * *